United States Patent
Nister

(10) Patent No.: US 7,359,526 B2
(45) Date of Patent: Apr. 15, 2008

(54) METHOD AND APPARATUS FOR DETERMINING CAMERA POSE FROM POINT CORRESPONDENCES

(75) Inventor: David Nister, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 602 days.

(21) Appl. No.: 10/798,726

(22) Filed: Mar. 11, 2004

(65) Prior Publication Data

US 2004/0227820 A1    Nov. 18, 2004

Related U.S. Application Data

(60) Provisional application No. 60/453,625, filed on Mar. 11, 2003, provisional application No. 60/503,332, filed on Sep. 16, 2003.

(51) Int. Cl.
*G06K 9/00* (2006.01)
*G06K 9/32* (2006.01)

(52) U.S. Cl. ............. 382/100; 382/103; 382/154; 382/294

(58) Field of Classification Search ............. 382/154, 382/199, 294, 285, 107, 106, 291; 345/207
See application file for complete search history.

(56) References Cited

U.S. PATENT DOCUMENTS

| | | | | |
|---|---|---|---|---|
| 6,047,078 A | * | 4/2000 | Kang | 382/107 |
| 6,580,821 B1 | * | 6/2003 | Roy | 382/154 |
| 6,647,146 B1 | * | 11/2003 | Davison et al. | 382/199 |
| 6,647,147 B1 | * | 11/2003 | Miyano | 382/199 |
| 6,741,757 B1 | * | 5/2004 | Torr et al. | 382/294 |
| 6,956,569 B1 | * | 10/2005 | Roy et al. | 345/426 |
| 6,970,591 B1 | * | 11/2005 | Lyons et al. | 382/154 |
| 6,980,690 B1 | * | 12/2005 | Taylor et al. | 382/154 |
| 6,996,254 B2 | * | 2/2006 | Zhang et al. | 382/107 |
| 2003/0012410 A1 | * | 1/2003 | Navab et al. | 382/103 |
| 2003/0030638 A1 | * | 2/2003 | Astrom et al. | 345/420 |
| 2003/0044048 A1 | * | 3/2003 | Zhang et al. | 382/107 |

OTHER PUBLICATIONS

Brown, "3D Head Tracking Using Motion Adaptive Texture-Mapping," cvpr, p. 998, 2001 IEEE Computer Society Conference on Computer Vision and Pattern Recognition (CVPR'01)—vol. 1, 2001.*

(Continued)

*Primary Examiner*—Bhavesh M. Mehta
*Assistant Examiner*—Andrae Allison
(74) *Attorney, Agent, or Firm*—Lowenstein Sandler PC

(57) ABSTRACT

A method and apparatus for determining camera pose from point correspondences. Specifically, an efficient solution to the classical five-point relative pose problem is presented. The problem is to find the possible solutions for relative camera motion between two calibrated views given five corresponding points. The method consists of computing the coefficients of a tenth degree polynomial and subsequently finding its roots. The method is well suited for numerical implementation that also corresponds to the inherent complexity of the problem. The method is used in a robust hypothesize- and-test framework to estimate structure and motion in real-time.

14 Claims, 3 Drawing Sheets

OTHER PUBLICATIONS

Szelishi et al, "Matching 3-D anatomical surfaces with non-rigid deformations using octree-splines"International Journal of Computer Vision archive, vol. 18, Issue 2 (May 1996) table of contents, pp. 171-186 , Year of Publication: 1996.*

Mohr, "Relative 3D Reconstruction Using Multiple Uncalibrated Images", International Journal of Robotics Research, vol. 14, No. 6, pp. 619-632, 1995.*

Heyden et al, "Reconstruction from Calibrated Cameras-A New Proof of the Kruppa-Demazure Theorem", Journal of Mathematical Imaging and Vision 10, 123-142 (1999) 1999 Kluwer Academic Publishers.*

Faugeras et al, "Motion from points matches multiplicity of solution", International Journal of Computer Vision, 4, 225-246 (1990).*

Hartley et al, "Reconstruction from two views using approximate calibration", Proc. 5th Asian Conference on Computer Vision, Melbourne, Australia, Jan. 2002.*

Quan et al, "Linear N-Point Camera Pose Determination", IEEE Transactions on Pattern Analysis and Machine Intelligence, vol. 21, No. 8, Aug. 1999.*

Nister, "Preemptive RANSAC for Live Structure and Motion Estimation," Proceedings of the Ninth IEEE International Conference on Computer Vision (ICCV 2003) © 2003 IEEE.

Nister, An Efficient Solution to the Five-Point Relative Pose Problem, Transactions on Pattern Analysis and Machine Intelligence, 26(6), Jun. 2004, 756-770.

* cited by examiner

| A | $x^3$ | $y^3$ | $x^2y$ | $xy^2$ | $x^2z$ | $y^2z$ | $x^2$ | $y^2$ | $xyz$ | $xy$ | $xz^2$ | $xz$ | $x$ | $yz^2$ | $yz$ | $y$ | 1 | |
|---|---|---|---|---|---|---|---|---|---|---|---|---|---|---|---|---|---|---|
| (a) | 1 | . | . | . | . | . | . | . | . | . | . | . | . | . | . | . | . | [3] |
| (b) | | 1 | . | . | . | . | . | . | . | . | . | . | . | . | . | . | . | [3] |
| (c) | | | 1 | . | . | . | . | . | . | . | . | . | . | . | . | . | . | [3] |
| (d) | | | | 1 | . | . | . | . | . | . | . | . | . | . | . | . | . | [3] |
| (e) | | | | | 1 | . | . | . | . | . | . | . | . | . | . | . | . | [3] |
| (f) | | | | | | 1 | . | . | . | . | . | . | . | . | . | . | . | [3] |
| (g) | | | | | | | 1 | . | . | L | . | . | . | M | N | O | . | [3] |
| (h) | | | | | | | | 1 | P | Q | R | S | . | . | . | . | . | [3] |
| (i) | | | | | | | | | 1 | . | . | . | . | . | . | . | . | [3] |

METHOD AND APPARATUS FOR DETERMINING CAMERA POSE FROM POINT CORRESPONDENCES

This application claims the benefit of U.S. Provisional Application No. 60/453,625 filed on Mar. 11, 2003 and No. 60/503,332 filed on Sep. 16, 2003, which are herein incorporated by reference.

The present invention relates to a novel method and apparatus for image processing. Specifically, the present invention provides an efficient, general and robust method for determination of the relative viewpoints of calibrated cameras by analysis of 5-tuples of corresponding image points across two (2) or more image or video frames.

This invention was made with U.S. government support under U.S. Army contract number DAAD19-01-2-0012. The U.S. government has certain rights in this invention.

BACKGROUND OF THE INVENTION

Field of the Invention

Reconstruction of camera positions and scene structure based on images of scene features from multiple viewpoints has been studied for over two centuries, first by the photogrammetry community and more recently in computer vision. The five-point problem arises when given the images of five unknown scene points from two distinct unknown viewpoints. What are then the possible solutions for the configuration of the points and cameras? Clearly, only the relative positions of the points and cameras can be recovered. Moreover, the overall scale the configuration can never be recovered solely from images.

Apart from this ambiguity, the five-point problem was proven to have at most eleven solutions. This finding was improved upon by showing that there are at most ten solutions and that there are ten solutions in general (including complex ones). The ten solutions correspond to the roots of a tenth degree polynomial. However, the only previously known method of deriving the coefficients of the tenth degree polynomial in the general case requires the non-trivial operation of finding all intersections between two sextic curves.

SUMMARY OF THE INVENTION

In one embodiment, the method presented in this specification provides a better elimination that leads directly to the tenth degree polynomial. Thus, an efficient method that corresponds exactly to the intrinsic degree of difficulty of the problem is obtained. In one embodiment, for the structure and motion estimation to be robust and accurate in practice, more than five points are used. Making use of many points is to minimize a cost function over all points.

The present method for the five-point method is implemented as a hypothesis generator within a random sample consensus scheme (RANSAC). Specifically, many random samples containing five point correspondences are taken. Each sample yields a number of hypotheses for the relative orientation that are then scored by a robust statistical measure over all points in two or more views. The best hypothesis is then refined iteratively. Such a hypothesis-and-test architecture can be used to deal with mismatched point correspondences and has made automatic reconstructions spanning hundreds of views possible.

In one embodiment, the present invention enforces intrinsic calibration constraints that often gives a crucial improvement of both the accuracy and robustness of the structure and motion estimates. When the intrinsic parameters, e.g., focal length, are known a priori, the five-point method is a more direct way of enforcing the calibration constraints exactly and obtaining a Euclidean reconstruction. The accuracy and robustness improvements gained by enforcing the calibration constraints are particularly significant for planar or near planar scenes and scenes that appear planar in the imagery. Thus, uncalibrated methods will often fail when faced with coplanar scene points, since there is then a continuum of possible solutions.

In the calibrated setting, coplanar scene points only cause at most a two-fold ambiguity. With a third view, the ambiguity is in general resolved. In light of this, a RANSAC scheme that uses the five-point method over three or more views is presented. It applies to general structure but also continues to operate correctly despite scene planarity, without relying on or explicitly detecting the degeneracy. In essence, the present calibrated model can cover both the planar and general structure cases seamlessly.

Thus, in one embodiment, the present invention operates in a calibrated framework where the intrinsic parameters are assumed known. This brings increased stability. More importantly, it has the distinct advantage that the estimated camera motion and scene structure can be put in a metric coordinate frame directly, without delay due to self-calibration. Thus, the present invention may operate live and in real-time with low delay, e.g., to perform real-time estimation of general motion of a calibrated perspective camera.

Furthermore, the present invention provides a unique scoring of the motion hypotheses. Specifically, a preemptive scoring method is presented.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
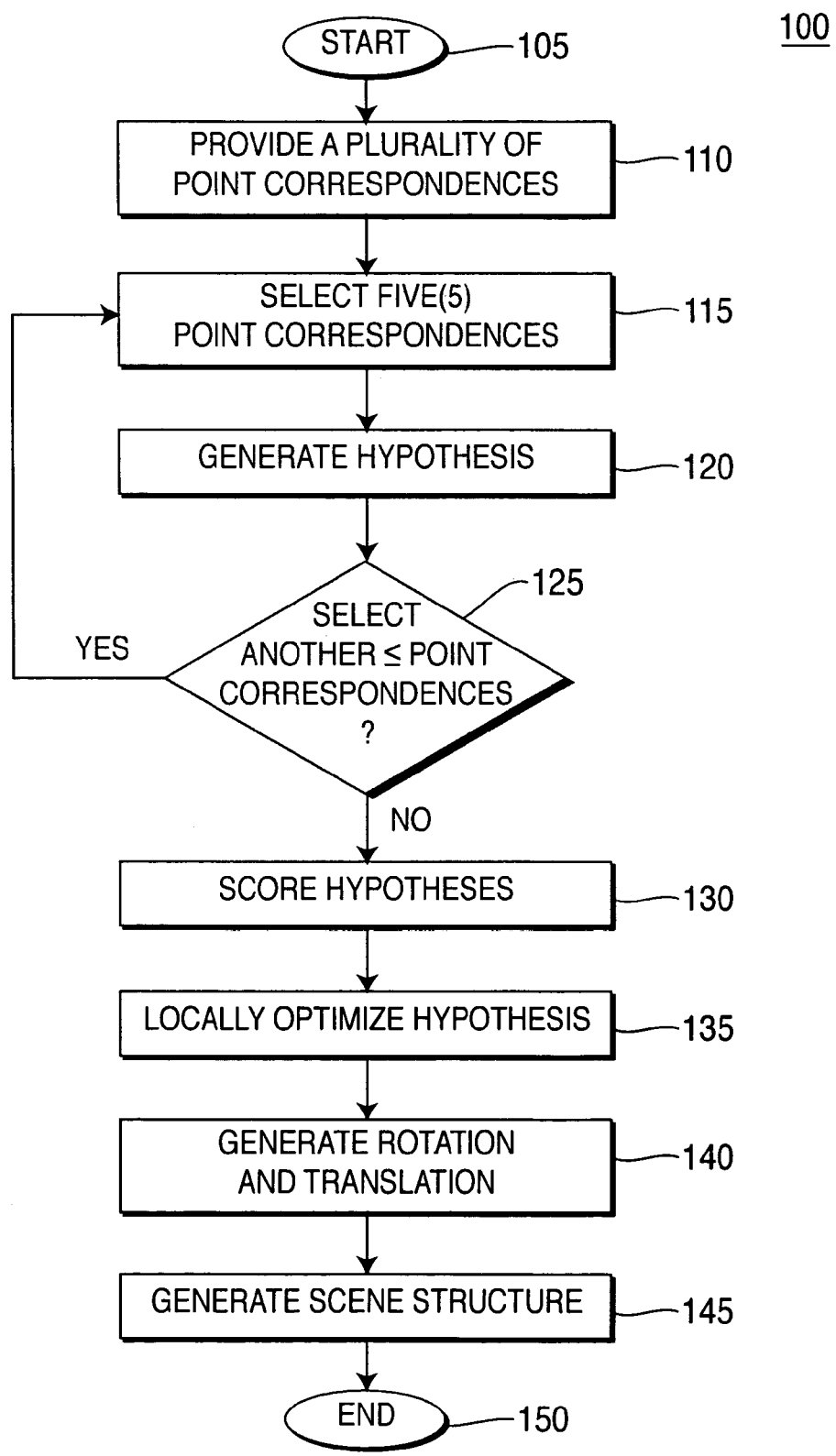
FIG. 1 illustrates a flowchart of a method for generating solutions to camera motion and scene structure from a plurality of images.

FIG. 1 illustrates a flowchart of a method 100 for generating solutions to camera motion and scene structure from a plurality of images. FIG. 1 illustrates the present invention in broad steps, where each step will be further disclosed below. Method 100 starts in step 105 and proceeds to step 110.

Figures 2, 3:
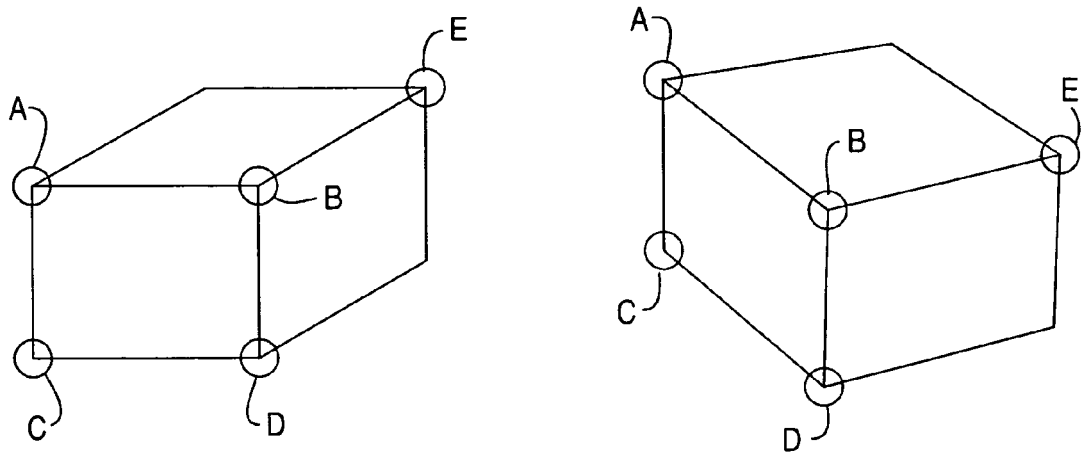
FIG. 2 illustrates an example of a set of 5 point correspondences of a scene.
FIG. 3 illustrates an equation system of the present invention.

In step 110, a plurality of point correspondences are provided between at least two images. In other words, pairs of image points within a scene are identified between two images of the same scene. For example, FIG. 2 illustrates an example of a set of 5 point correspondences of a scene. If two images showing a scene containing a wooden crate that is taken from two different camera views, then corresponding corners A-E of the wooded crates are considered a set of 5 point correspondences of a scene. Of course, this scene contains many point correspondences that are not specifically labeled. In practice, the point correspondences can be identified using an automatic feature matcher (e.g., C. Harris and M. Stephens. A combined corner and edge detector, In *Proc. 4th Alvey Vision Conference*, pages 147-151, 1988.), or are generated manually.

In step 115, a set of five point correspondences is selected from the plurality of point correspondences. Method 100 in step 120 generates one or more hypotheses from the set of five point correspondences.

In step 125, method 100 queries whether another set of five point correspondences should be selected. If the query is positively answered, then method 100 returns to step 115, where steps 115 and 120 are repeated on a newly selected set of five point correspondences, thereby generating a plurality of hypotheses. If the query is negatively answered, then method 100 proceeds to step 130. The number of iterations is application dependent, e.g., up to several hundred iterations if necessary depending on the processing capability or time constraints (e.g., real time application) of a particular system.

In step 130, method 100 scores the hypotheses, thereby ranking the likelihood of each hypothesis that will likely produce the most accurate solutions to camera motion and scene structure. For example, method 100 may implement a scoring method that is based on image reprojection error. Once the hypotheses are scored, it is now possible to deduce and select the best hypothesis for further processing.

In step 135, the selected hypothesis can be optionally optimized. Namely, it can be locally optimized.

In step 140, method 100 then generates the camera's rotation and translation information directly from the selected or optimized hypothesis. In turn, using the generated rotation and translation information, method 100 can now generate scene structure in step 145. Method 100 ends in step 150.

It should be noted that method 100 is provided to only illustrate an exemplary flow of steps, but it is not intended to limit the present invention. For example, it is possible to select all the sets of 5 point correspondences first and then perform hypothesis generation on all the selected sets of 5 point correspondences and so on.

The various steps of FIG. 1 will now be described in greater detail. Image points are represented by homogeneous 3-vectors q and q' in the first and second view, respectively. World points are represented by homogeneous 4-vectors Q. A perspective view is represented by a 3×4 camera matrix P indicating the image projection q~PQ, where ~ denote equality up to scale. A view with a finite projection center can be factored into P=K [R|t], where K is a 3×3 upper triangular calibration matrix holding the intrinsic parameters and R is a rotation matrix. Let the camera matrices for the two views be $K_1[I|0]$ and $P=K_2[R|t]$. Let $[t]_x$ denote the skew symmetric matrix $$[t]_x = \begin{bmatrix} 0 & -t_3 & t_2 \\ t_3 & 0 & -t_1 \\ -t_2 & t_1 & 0 \end{bmatrix} \quad (1)$$

so that $[t]_x \chi = t \times \chi$ for all $\chi$. Then the fundamental matrix is $$F \equiv K_2^{-T}[t]_x R K_1^{-1}. \quad (2)$$

The fundamental matrix encodes the well known coplanarity, or epipolar constraint $$q'^T F q = 0. \quad (3)$$

If $K_1$ and $K_2$ are known, the cameras are said to be calibrated. In this case, the present invention can always assume that the image points q and q' have been premultiplied by $K_1^{-1}$ and $K_2^{-1}$ respectively, so that the epipolar constraint simplifies to $$q'^T E q = 0, \quad (4)$$

where the matrix $E \equiv [t]_x R$ is called the essential matrix. Any rank-2 matrix is a possible fundamental matrix, i.e., having the single cubic constraint:

Theorem 1: A real non-zero 3×3 matrix F is a fundamental matrix if and only if it satisfies the equation $$det(F) = 0. \quad (5)$$

An essential matrix has the additional property that the two non-zero singular values are equal. This leads to the following important cubic constraints on the essential matrix:

Theorem 2: A real non-zero 3×3 matrix E is an essential matrix if and only if it satisfies the equation:

$$EE^T E - \frac{1}{2}\text{trace}(EE^T)E = 0 \quad (6)$$

This property will help us recover the essential matrix. Once the essential matrix is known, R, t and the camera matrices can be recovered from it as discussed in step 140 of FIG. 1. It should be noted that the 5 and 6-point methods recover the essential matrix using the constraints or equations (4) and (6) while the 7 and 8-point methods recover the fundamental matrix using equations (3) and (5). It should be noted that the fundamental matrix is a more general concept (i.e. every essential matrix is also a fundamental matrix)

The five-point method is now described, first in a straightforward manner. Recommendations for an efficient implementation are then given below. Each of the five point correspondences gives rise to a constraint of the form (4). This constraint can also be written as:

$$\tilde{q}^T \tilde{E} = 0, \quad (7)$$

where $$\tilde{q} \equiv [q_1 q_1' q_2 q_1' q_3 q_1' q_1 q_2' q_2 q_2' q_3 q_2' q_1 q_3' q_2 q_3' q_3 q_3']^T \quad (8)$$

$$\tilde{E} \equiv [E_{11} E_{12} E_{13} E_{21} E_{22} E_{23} E_{31} E_{32} E_{33}]^T \quad (9)$$

By stacking the vectors $\tilde{q}^T$ for all five points, a 5×9 matrix is obtained. Four vectors $\tilde{X}, \tilde{Y}, \tilde{Z}, \tilde{W}$ that span the right nullspace of this matrix are now computed. The most common way to achieve this is by singular value decomposition, but QR-factorization as described below is much more efficient. The four vectors correspond directly to four 3×3 matrices X, Y, Z, W and the essential matrix must be of the form:

$$E = xX + yY + zZ + wW \quad (10)$$

for some scalars x, y, z, w. The four scalars are only defined up to a common scale factor and it is therefore assumed that w=1. Note here that the method can be extended to using more than 5 points in much the same way as the uncalibrated 7 and 8-point methods. In the overdetermined case, the four singular vectors X, Y, Z, W that correspond to the four smallest singular values are used. By inserting (10) into the nine cubic constraints (6) and performing Gauss-Jordan elimination with partial pivoting, an equation system is obtained as illustrated in FIG. 3, where . and L, . . . , S denote some scalar values and [n] denotes a polynomial of degree n in the variable z.

Note that the elimination can optionally be stopped two rows early. Further, define the additional equations $$(j) \equiv (e) - z(g) \quad (11)$$

$$(k) \equiv (f) - z(h) \quad (12)$$

$$(l) \equiv (d) - x(h) + P(c) + zQ(e) + R(e) + S(g) \quad (13)$$

$$(m) \equiv (c) - y(g) + L(d) + zM(f) + N(f) + O(h). \quad (14)$$

The present invention now discloses these five equations $$(i) = xy[1] + x[2] + y[2] + [3] = 0 \quad (15)$$

$$(j) = xy[1] + x[3] + y[3] + [4] = 0 \quad (16)$$

$$(k) = xy[1] + x[3] + y[3] + [4] = 0 \quad (17)$$

$$(l) = xy[2] + x[3] + y[3] + [4] = 0 \quad (18)$$

$$(m) = xy[2] + x[3] + y[3] + [4] = 0. \quad (19)$$

These equations are arranged into two 4×4 matrices containing polynomials in z:

| B   | xy  | x   | y   | 1   |
|-----|-----|-----|-----|-----|
| (i) | [1] | [2] | [2] | [3] |
| (j) | [1] | [3] | [3] | [4] |
| (k) | [1] | [3] | [3] | [4] |
| (l) | [2] | [3] | [3] | [4] |

| C   | xy  | x   | y   | 1   |
|-----|-----|-----|-----|-----|
| (i) | [1] | [2] | [2] | [3] |
| (j) | [1] | [3] | [3] | [4] |
| (k) | [1] | [3] | [3] | [4] |
| (m) | [2] | [3] | [3] | [4] |

Since the vector $[xy \ x \ y \ 1]^T$ is a nullvector to both these matrices, their determinant polynomials must both vanish. Let the two eleventh degree determinant polynomials be denoted by (n) and (o), respectively. The eleventh degree term is cancelled between them to yield the tenth degree polynomial $$(p) \equiv (n) o_{11} - (o) n_{11} \quad (20)$$

The real roots of (p) are now computed. There are various standard methods to accomplish this. A highly efficient way is to use Sturm-sequences to bracket the roots, followed by a root-polishing scheme. This is described below. Another method, which is easy to implement with most linear algebra packages, is to eigen-decompose a companion matrix. After normalizing (p) so that $p_{10}=1$, the roots are found as the eigenvalues of the 10×10 companion matrix $$\begin{bmatrix} p_9 & p_8 & \cdots & p_0 \\ -1 & & & \\ & \ddots & & \\ & & -1 & \end{bmatrix} \quad (21)$$

For each root z the variables x and y can be found using equation system B. The last three coordinates of a nullvector to B are computed, for example by evaluating the three 3×3 determinants obtained from the first three rows of B by striking out the columns corresponding to x, y and 1, respectively. The essential matrix is then obtained from (9). It is described below how to recover R and t from the essential matrix.

Let $$D = \begin{bmatrix} 0 & 1 & 0 \\ -1 & 0 & 0 \\ 0 & 0 & 1 \end{bmatrix} \quad (22)$$

R and t are recovered from the essential matrix on the basis of the following theorem:

Theorem 3: Let the singular value decomposition of the essential matrix be $E \sim U_{diag}(1, 1, 0)V^T$, where U and V are chosen such that det(U)>0 and det(V)>0. Then $t \sim t_u \equiv [u_{13} \ u_{23} \ u_{33}]^T$ and R is equal to $R_a \equiv UDV^T$ or $R_b \equiv UD^TV^T$.

Any combination of R and t according to the above prescription satisfies the epipolar constraint (4). To resolve the inherent ambiguities, it is assumed that the first camera matrix is [I|0] and that t is of unit length. There are then the following four possible solutions for the second camera matrix: $P_A \equiv [R_a | t_u]$, $P_B \equiv [R_a | -t_u]$, $P_C \equiv [R_b | t_u]$, $P_D \equiv [R_b | -t_u]$. One of the four choices corresponds to the true configuration. Another one corresponds to the twisted pair which is obtained by rotating one of the views 180 degrees around the baseline. The remaining two correspond to reflections of the true configuration and the twisted pair. For example, $P_A$ gives one configuration. $P_C$ corresponds to its twisted pair, which is obtained by applying the transformation $$H_t \equiv \begin{bmatrix} I & 0 \\ -2v_{13} & -2v_{23} & -2v_{33} & -1 \end{bmatrix} \quad (23)$$

$P_B$ and $P_D$ correspond to the reflections obtained by applying $H_r \equiv diag(1, 1, 1, -1)$. In order to determine which choice corresponds to the true configuration, the cheirality constraint is imposed. One point is sufficient to resolve the ambiguity. The point is triangulated using the view pair $([I|0], P_A)$ to yield the space point Q and cheirality is tested. If $c_1 \equiv Q_3 Q_4 < 0$, the point is behind the first camera. If $c_2 \equiv (P_A Q)_3 Q_4 < 0$, the point is behind the second camera. If $c_1 > 0$ and $c_2 > 0$, $P_A$ and Q correspond to the true configuration. If $c_1 < 0$ and $c_2 < 0$, the reflection $H_r$ is applied and the process get $P_B$. If on the other hand $c_1 c_2 < 0$, the twist $H_t$ is applied and the process get $P_C$ and the point $H_t Q$. In this case, if $Q_3 (H_t Q)_4 > 0$ the process is done. Otherwise, the reflection $H_r$ is applied and the process get $P_D$.

In summary, in one embodiment the main computational steps of the method outlined above are as follows:

1. Extraction of the nullspace of a 5×9 matrix.
2. Expansion of the cubic constraints (6).
3. Gauss-Jordan elimination on the 9×20 matrix A.
4. Expansion of the determinant polynomials of the two 4×4 polynomial matrices B and C followed by elimination to obtain the tenth degree polynomial (20).
5. Extraction of roots from the tenth degree polynomial.
6. Recovery of R and t corresponding to each real root and point triangulation for disambiguation.

The present invention will disclose an efficient implementation of Steps 1, 5 and 6. Singular value decomposition is the gold standard for the nullspace extraction in Step 1, but a specifically tailored QR-factorization is much more efficient. The five input vectors are orthogonalized first, while pivoting, to form the orthogonal basis $\tilde{q}_1, \ldots, \tilde{q}_5$. This basis is then amended with the 9×9 identity matrix to form the matrix $$[\tilde{q}_1 \ldots \tilde{q}_5 | I]^T \qquad (24)$$

The orthogonalization with pivoting is now continued until nine orthogonal vectors are obtained. The last four rows constitute an orthogonal basis for the nullspace.

Sturm sequences are used to bracket the roots in Step 5. The definition of a Sturm sequence, also called Sturm chain is given below. The tenth degree polynomial has an associated Sturm sequence, which consists of eleven polynomials of degree zero to ten. The number of real roots in an interval can be determined by counting the number of sign changes in the Sturm sequence at the two endpoints of the interval. The Sturm sequence can be evaluated recursively with 38 floating point operations. 10 additional operations are required to count the number of sign changes. This is to be put in relation to the 20 floating point operations required to evaluate the polynomial itself. With this simple test for number of roots in an interval, it is fairly straightforward to hunt down a number of intervals, each containing one of the real roots of the polynomial. Any root-polishing scheme can then be used to determine the roots accurately. In one embodiment, the present invention uses 30 iterations of bisection, since this provides a guaranteed precision in fixed time and requires almost no control overhead.

Step 6 requires a singular value decomposition of the essential matrix and triangulation of one or more points. When all the other steps of the method have been efficiently implemented, these operations can take a significant portion of the computation time, since they have to be carried out for each real root. A specifically tailored singular value decomposition is given below. Efficient triangulation is also discussed below. Note that a triangulation scheme that assumes ideal point correspondences can be used since for true solutions the recovered essential matrix is such that intersection is guaranteed for the five pairs of rays.

A calibrated framework provides advantages over a non-calibrated framework. To illustrate, the planar structure degeneracy is an interesting example of the differences between the calibrated and uncalibrated frameworks. The degrees of ambiguity that arise from a planar scene in the two frameworks are summarized in Table 1.

TABLE 1

|  | 1 View Known Structure | 2 Views Unknown Structure | n > 2 Views Unknown Structure |
| --- | --- | --- | --- |
| Known intrinsics | Unique | Two-fold or unique | Unique |
| Unknown fixed focal length | Unique in general | 1 d.o.f. | Unique in general |
| Unknown variable intrinsics | 3 d.o.f. | 2 d.o.f. | 3n-4 d.o.f. |

Table 1 illustrates the degrees of ambiguity in the face of planar degeneracy for pose estimation and structure and motion estimation. The motion is assumed to be general and the structure is assumed to be dense in the plane.

For pose estimation with known intrinsics there is a unique solution provided that the plane is finite and that the cheirality constraint is taken into account. If the plane is the plane at infinity it is impossible to determine the camera position and without the cheirality constraint the reflection across the plane constitutes a second solution. Focal length can also be determined if the principal direction does not coincide with the plane normal. Without knowledge of the intrinsics however, there is a three degree of freedom ambiguity that can be thought of as parameterised by the position of the camera center. For any camera center, appropriate choices for the calibration matrix K and rotation matrix R can together produce any homography between the plane and the image. With known intrinsics and two views of an unknown plane, there are two solutions for the essential matrix, unless the baseline is perpendicular to the plane in which case there is a unique solution. The cheirality constraint resolves the ambiguity unless all visible points are closer to one viewpoint than the other. If all visible points are closer to one viewpoint, the dual solution is obtained from the true one by reflecting that view across the plane and then taking the twisted pair of the resulting configuration. Any attempts to recover intrinsic parameters from two views of a planar surface are futile according to the following theorem:

Theorem 4: For any choice of intrinsic parameters, any homography can be realized between two views by some positioning of the two views and a plane.

If the calibration matrices are completely unknown, there is a two degree of freedom ambiguity, that can be thought of as parameterized by the epipole in one of the images, i.e. for any choice of epipole in the first image, there is a unique valid solution. Once the epipole is specified in the first image, the problem of solving for the remaining parameters of the fundamental matrix is algebraically equivalent to solving for the projective pose of a one-dimensional camera in a two-dimensional world, where the projection center of the 1-D camera corresponds to the epipole in the second image, the orientation corresponds to the epipolar line homography and the points in the second image correspond to world points in the 2-D space. This problem according to Chasles' Theorem has a unique solution unless all the points lie on a conic. Hence there is a unique solution unless all the points in the second image lie on a conic, which is not the case since it is assumed that the structure is dense in the plane. For three views with known intrinsic there is a unique solution. If the views are in general position a common unknown focal length can also be recovered but this requires rotation and suffers from additional critical configurations. With unknown variable intrinsics there is an additional 3 degrees of freedom for each additional view above two.

The present invention uses the method in conjunction with random sampling consensus in two or three views. A number of random samples are taken, each containing five point-tracks. The five point method is applied to each sample and thus a number of hypotheses are generated as discussed in step 120 of FIG. 1. In the two-view case, the hypotheses are scored by a robust measure over all the point pairs and the hypothesis with the best score is retained as discussed in step 130 of FIG. 1. Finally, the best hypothesis can be polished by iterative refinement, e.g., known as bundle adjustment, or local optimization as discussed in step 135 of FIG. 1. When three or more views are available, it is preferred to disambiguate and score the hypotheses utilizing three views. A unique solution can then be obtained from each sample of five tracks and this continues to hold true even if the scene points are all perfectly coplanar. For each sample of five point-tracks, the points in the first and last view are used in the five-point method to determine a number of possible camera matrices for the first and last view. For each case, the five points are triangulated (see below). The remaining view can now be determined by any 3-point calibrated perspective pose algorithm. Up to four solutions are obtained and disambiguated by the additional two points. The reprojection errors of the five points in all of the views are now enough to single out one hypothesis per sample. Finally, the solutions from all samples are scored by a robust measure using all available point tracks as further discussed below.

A. Definition Of Sturm Chain: Let p(z) be a general polynomial of degree n>=2. Here, the significance of general is that special cases are ignored for the sake of brevity. For example, p(z) is assumed to have no multiple roots. Moreover, the polynomial divisions carried out below are assumed to have a non-zero remainder. Under these assumptions, the Sturm chain is a sequence of polynomials $f_o, \ldots, f_n$, of degrees $0, \ldots, n$, respectively. $f_n$ is the polynomial itself and $f_{n-1}$ is its derivative:

$$f_n(z) \equiv p(z) \quad (25)$$

$$f_{n-1}(z) \equiv p'(z). \quad (26)$$

For $i=n, \ldots, 2$, the polynomial division $f_i/f_{i-1}$ is carried out. Let the quotient of this division be $q_i(z)=k_i z+m_i$ and let the remainder be $r_i(z)$, i.e. $f_i(z)=q_i(z)f_{i-1}(z)+r_i(z)$. Then define $f_{i-2}(z) \equiv -r_i(z)$. Finally, define the coefficients $m_0$, $m_1$ and $k_1$ such that $$f_o(z)=m_o \quad (27)$$

$$f_1(z)=k_1 z+m_1. \quad (28)$$

Once the scalar coefficients $k_1, \ldots k_n$ and $m_0 \ldots, m_n$ have been derived, the Sturm chain can be evaluated at any point z through Equations (27, 28) and the recursion $$f_i(z)=(k_i z+m_i)f_{i-1}(z)-f_{i-2}(z) i=2, \ldots, n \quad (29)$$

Let the number of sign changes in the chain be s(z). The number of real roots in an interval [a, b] is then s(a)−s(b). Unbounded intervals such as for example [0, ∞) can be treated by looking at $m_0$ and $k_0, \ldots, k_n$ in order to calculate $\lim_{z \to \infty} s(z)$.

B. Efficient Singular Value Decomposition Of The Essential Matrix: An efficient singular value decomposition according to the conditions of Theorem 3 is given. Let the essential matrix be $E=[e_a \ e_b \ e_c]^T$ where $e_a, e_b, e_c$ are column-vectors. It is assumed that it is a true essential matrix, i.e. that it has rank two and two equal non-zero singular values.

First, all the vector products $e_a \times e_b$, $e_a \times e_c$ and $e_b \times e_c$ are computed and the one with the largest magnitude chosen. Assume without loss of generality that $e_a \times e_b$ has the largest magnitude. Define $v_c \equiv (e_a \times e_b)/|e_a \times e_b|$, $v_a \equiv e_a/|e_a|$, $v_b \equiv v_c \times v_a$, $u_a \equiv Ev_a/|Ev_a|$, $u_b \equiv Ev_b/|Ev_b|$ and $u_c \equiv u_a \times u_b$. Then the singular value decomposition is given by $V=[v_a \ v_b \ v_c]$ and $U=[u_a \ u_b \ u_c]$.

C. Efficient Triangulation Of An Ideal Point Correspondence: In the situation encountered in the five-point method where triangulation is needed, a hypothesis for the essential matrix E has been recovered and along with it the two camera matrices [I|0] and P. No error metric has to be minimized, since for the true solution the rays backprojected from the image correspondence q⇌q' are guaranteed to meet. For non-ideal point correspondences, prior correction to guarantee ray-intersection while minimizing a good error metric is recommended. Global minimization of $\|.\|_2$-norm in two views requires solving a sixth degree polynomial. Minimization of $\|.\|_\infty$-norm, or directional error, also yields good results in practice and can be achieved in closed form an order of magnitude faster. In the ideal situation, triangulation can be accomplished very efficiently by intersecting three planes that are back-projected from image lines. The image lines chosen to generate the three planes are the epipolar line a corresponding to q', the line b through q that is perpendicular to a and the line c through q' that is perpendicular to Eq. For non-ideal point correspondences, this scheme finds the world point on the ray backprojected from q' that minimizes the reprojection error in the first image. It triangulates world points at infinity correctly and is invariant to projective transformations of the world space.

Observe that $a=E^T q'$, $b=q \times (\text{diag}(1, 1, 0)a)$ and $c=q' \times (\text{diag}(1, 1, 0)Eq)$. Moreover, $A \equiv [a^T 0]^T$ is the plane backprojected from a, $B \equiv [b^T 0]^T$ is the plane backprojected from b and $C \equiv P^T c$ is the plane backprojected from c. The intersection between the three planes A, B and C is now sought. Formally, the intersection is the contraction $Q_j \equiv \epsilon_{ijkl} A^i B^j C^k$ between the epsilon tensor $\epsilon_{ijkl}$ and the three planes. The epsilon tensor $\epsilon_{ijkl}$ is the tensor such that $\epsilon_{ijkl} A^i B^j C^k D^l = \det([A \ B \ C \ D])$. More concretely, $d \equiv a \times b$ is the direction of the ray backprojected from the intersection between a and b. The space point is the intersection between this ray and the plane C:

$$Q \sim [d^T C_4 - (d_1 C_1 + d_2 C_2 + d_3 C_3)]^T \quad (30)$$

Finally, it is observed that in the particular case of an ideal point correspondence, d=q, so that computing a, b and A, B can be avoided altogether. Thus, one illustrative example of the scene structure generating step 145 of FIG. 1 is disclosed.

Thus, an efficient method for solving the five-point relative pose problem is presented. The present method can be used in conjunction with random sampling consensus to solve for unknown structure and motion over two, three or more views. The efficiency of the method is very important since it will typically be applied within this kind of hypothesize-and-test architecture, where the method is executed for hundreds of different five-point samples. Practical real-time reconstruction results have been observed and it was shown that the calibrated framework can continue to operate correctly despite scene planarity.

A preemptive scoring method of the motion hypotheses is now disclosed. In the RANSAC paradigm, a number of random samples consisting of minimal sets are taken from the observations. A minimal set contains the smallest number of observations needed to solve for the motion model. The present disclosure refers to the algebraic solution that goes from the minimal set to the motion model as a hypothesis generator. In the present calibrated framework, the 5-point method is used for two and three views. The 5 point method yields multiple solutions and an additional point can be used to select between the hypotheses, effectively creating a 5-with-6 point method. The hypotheses are scored according to their posterior likelihood and a unique hypothesis is singled out as the winner. For simplicity the present invention will consider maximum likelihood, i.e. the case of a uniform prior. For the most part, the extension to an arbitrary prior is straightforward. Each robust fit is finished off by iterative refinement to achieve the highest accuracy possible. In two views, the present invention eliminates these structure parameters, but in three views full bundle adjustment is performed. The reason is that when fully optimized, bundle adjustment turns out to be just as fast as any attempts to eliminate the structure parameters.

It should be noted that although the present scoring method is discussed within the context of a 5-point method. The present invention is not so limited. In other words, the present scoring method can be applied to hypotheses generated in accordance with any methods, e.g., 5-points, 6-points, 7-points and so on. The present scoring method is not limited to a particular hypothesis generating method.

The present disclosure will state the problem in its full generality before making simplifying assumptions. Assume that the present invention has a finite number of observations indexed by o=1, ..., N and a sequence of hypotheses indexed by h=1, ..., M, which may also have an infinite range. Throughout the disclosure, the present disclosure will assume that the observations have been randomly permuted to avoid any deterministic ordering that could otherwise ruin the quality of a preemptive scheme. Assume that the present invention has a scoring function p(o, h) that takes an observation index and a hypothesis index and gives a scalar value representing the log-likelihood of the observation given that the hypothesis is the correct motion model. The scalar value will be referred to simply as term since the log-likelihood L(h) of the hypothesis indexed by h is:

$$L(h) = \sum_{o=1}^{N} p(o, h) \quad (31)$$

Occasionally $L_i(h)$ is used to denote $\Sigma_{o=1}^{i} p(o,h)$. A scoring sequence is a sequence of index pairs $x_i=(o_j, h_i)$ indexed by i. An order rule $\phi$ is a rule $x_i=\phi_i(x_1, \ldots, x_{i-1}, p(x_1), \ldots, p(x_{i-1}))$ that assigns the next pair in the scoring sequence given all the previous scores. A preference rule $\phi$ is a rule that selects the preferred hypothesis $\phi_i((x_1, \ldots, x_i, p(x_1), \ldots, p(x_i))$ given all the scores so far. A preemption scheme $\Omega=(\phi,\phi)$ is defined by an order rule and a preference rule. The order rule defines in which order the scoring will occur and the preference rule determines which hypothesis is the best when the time budget is exhausted. The present invention allows the preference rule to take on the value zero, $\phi_i=0$ meaning simply that preemption is not allowed at i and that scoring has to proceed to the next valid preemption point. The present invention will use $\Omega_i$ to denote the finite preemption scheme that scores up to i and then selects the preferred hypothesis $\phi_i$. A preemption scheme is called depth-first if the scoring sequence obeys $$h_i \leq h_j \forall (i,j): i \leq j \quad (32)$$

A preemption scheme is called breadth-first if the scoring sequence obeys $$o_i \leq o_j \forall (i,j): i \leq j \quad (33)$$

A scheme that is neither depth-first nor breadth-first is called hybrid. Assume that the time spent evaluating one term p(o, h) is a constant independent of o and h. Let this constant be the unit of time. Assume that the time spent generating a hypothesis is a constant $\tau$. The present invention will consider finite scoring sequences $X_i=(x_1, \ldots x_i)$. Let |X| be the number of elements in X. Let the hypothesis set H(X) be the set of hypotheses visited by X and |H(X)| be the number of elements in H (X). If overhead costs are neglected and that only the hypotheses in the hypothesis set are computed, the time t(X) spent evaluating X is $$t(X) = |H(X)|\tau + |X|. \quad (34)$$

A preemption scheme is called lossless if $$L(\phi_i) \geq L(h) \forall (i,h): (\phi_i \neq 0),(h \in H(X_i)) \quad (35)$$

Thus, a preemption scheme is lossless if at a valid preemption point, no hypothesis from the hypothesis set can have a higher likelihood than the preferred hypothesis. A lossless scheme might make sense when the hypothesis generation cost is extremely high. On the other hand, under such circumstances the scoring is computationally cheap compared to the hypothesis generation, so preemptive scoring is not very meaningful. Even the standard RANSAC scheme is a fundamentally stocastic algorithm without deterministic guarantees of finding the global maximum of the likelihood. The present invention is not obligated to find the best hypothesis from some particular set of hypotheses, which have been generated randomly in the first place. The computational resources are always limited in practice and a lossy scheme can potentially consider more hypotheses than a lossless one. Therefore, a lossy scheme can in fact be strictly better than a lossless scheme at maximizing the likelihood, depending on the goal of a particular implementation.

An ideal lossless sequence for a particular hypothesis set is the scoring sequence of a lossless preemption scheme with the smallest possible time among all lossless preemption schemes with that hypothesis set. An ideal lossless sequence for a particular set of observations and hypotheses is straightforward to compute and gives a performance bound for lossless schemes. As a simple rule of thumb, an ideal lossless sequence will be on the order of the number of outliers times |H(X)| terms long, although this of course depends on the scoring function among other things.

The present invention will regard the log-likelihood L($\phi$) of the preferred hypothesis as a random variable, where the randomness is caused by the random sampling and the random permutation of observations. The present invention defines the efficiency E($\Omega_i$) of a preemption scheme $\Omega_i$ to be the expected log-likelihood of the preferred hypothesis, i.e.

$$E(L(\phi_i)) \quad (36)$$

For fair comparison, the efficiencies of preemption schemes with the same computation time should be considered.

Although the present preemption scoring scheme is disclosed as breadth-first, in practice one can implement it as a hybrid to reduce overhead. The scoring sequence is of a restricted type that is defined by a decreasing preemption function f(i) i=1, ..., N that indicates how many hypotheses are to be kept at each stage. The idea is to first generate all the hypotheses h=1, ... f(1) that will be used. All these hypotheses are then scored against the first observation. Based on the scores, the present invention keeps the best f(2) hypotheses and score them against the second observation. The process is repeated, scoring each observation o against the best f(o) hypotheses so far. To summarize in algorithmic form:

Algorithm 1

1. Randomly permute the observations.
2. Generate the hypotheses indexed by h=1, ..., f(1).
3. Compute the scores $L_1(h)=p(1,h)$ for h=1, ..., f(1). Set i=2.
4. Reorder the hypotheses so that the range h=1, ..., f(i) contains the best f(i) remaining hypotheses according to $L_{i-1}$ (h).

5. if i>N or f(i)=1, quit with the best remaining hypothesis as the preferred one, Otherwise, compute the scores $L_1(h)=p(i,h)+L_{i-1}(h)$ for $h=1, \ldots, f(i)$, increase i and go to Step 4.

This approach is appealing because hypotheses can be compared against each other throughout the whole process, rather than against some absolute quality measure. One can approximate this in a depth-first scheme by comparing to previously scored hypotheses, but a significant amount of time can be wasted before the first good hypothesis is found. It could be argued that the breadth-first scheme is at the risk of wasting time on bad observations in the same way as a depth-first scheme is in danger of wasting time on bad hypotheses. However, note that in the typical RANSAC setting, the hypotheses are composed from multiple observations and are typically useless if any one of those observations are outliers. Therefore, the fraction of good observations is much larger than the fraction of good hypotheses, which means that a naive breadth-first scheme will waste less of its time than a naive depth-first scheme. In one embodiment, it is possible to improve on the breadth-first scheme by starting with a diagonal scheme similar to the one discussed below to pre-sort observations based on their relative merit. This may decrease the amount of time wasted on bad observations. Ignoring overhead, the time spent in a preemption scheme of the type described by Algorithm 1 is $$t(f) = f(1)\tau + \sum_{o=1}^{N} f(o). \tag{37}$$

In real-time implementation, one can use the preemption function $$f(i) = \left\lfloor M 2^{-\lfloor \frac{i}{B} \rfloor} \right\rfloor \tag{38}$$

where $\lfloor . \rfloor$ denotes downward truncation, and B is a block size. This gives an execution-time of approximately $M(\tau+2B)$. The preemption function changes only after every observation, which means that the partial reordering step 4 only has to take place every $B^{th}$ iteration. The quartile needed to perform the partial ordering of Step 4 is found in average linear time with a quickselect algorithm.

A theoretical study of preemption in a simple inlier-outlier model is now presented, which is referred to as the inlier-and-model (i.a.-model). In a practical situation, the initial goal of the preemptive scoring is to quickly and efficiently weed out hypotheses that have been contaminated by outlier observations. The i.a.-model is useful for modeling this stage. Once only the noisy but otherwise good hypotheses are left, the goal of the scoring is to accurately discriminate between similar hypotheses using many observations. This stage is not modeled by the i.a.-model. Note however that the present preemption method can handle both stages. The iterative refinement used after the RANSAC process is also very efficient for achieving the goal of the second stage. Thus, the main responsibility of the preemptive scoring is to weed out contaminated hypotheses.

In the i.a.-model, the present invention makes the following assumptions in addition to the ones made above:

1. An observation is either an inlier or an outlier
2. A hypothesis is either an inlier or an outlier
3. The scoring function p(o, h) returns 1 if both o and h are inliers. Otherwise it returns 0.
4. Each hypothesis has a prior probability $\lambda$ of being an inlier. Moreover this prior probability is independent of the other hypotheses and the observations, ignoring e.g. the technicality that in practice the hypotheses are generated from the observations.

Remember that N denotes the number of observations. Let n be the number of inlier observations. Then $$\varepsilon = \frac{n}{N}$$

is the inlier fraction. The present invention uses $$\lambda = \varepsilon^s \tag{39}$$

where s is the sample size, i.e. the size of the minimal sets. In the i.a.-model, all uncontaminated hypotheses will have the same global likelihood. The efficiency is simply $$E(\Omega)=nP, \tag{40}$$

where P is the probability of finding an inlier pair, i.e. the probability that the scoring sequence will contain some pair $x_i$, with an inlier observation and an inlier hypothesis. This is considered to be a "good pairing" as discussed below.

The present invention first analyzes the efficiency of preemption with the c-out-of-d test, i.e. $T_{c,d}$ test, in this model. Outlier hypotheses never pass the test. Inlier hypotheses fail the test with a probability found from the cumulative distribution function of the hypergeometric density as:

$$u = \sum_{i=0}^{c-1} \binom{n}{i}\binom{N-n}{d-i}\binom{N}{d}^{-1} \tag{41}$$

If no good pairing is found up to time t, the number of completed tests will be:

$$\eta = \lfloor t/(\tau+d) \rfloor \tag{42}$$

If one assume that the algorithm blindly throws away all hypotheses that have not passed a complete test by the time t, P is simply the probability that some hypothesis passes the test before the time is up. Then $$P=1-[1+\lambda(\mu-1)]^\eta, \tag{43}$$

from which one can compute the efficiency of the preemption scheme with $T_{c,d}$ test.

The present preemption schemes of the type defined by Algorithm 1 are now discussed in the i.a.-model. For a given time budget t the present invention will determine a preemption function f that gives the maximum efficiency over all preemption functions. In order to accomplish this, the present invention will observe two things. First, a fixed scoring sequence $X_i$ is equivalent to any other scoring sequence that includes the same terms, regardless of order, provided that the scoring will not be stopped before the term indexed by i. Second, with Algorithm 1 in the i.a.-model, there is no reason to reorder the hypotheses before a good pairing has been found. More precisely, the probability of finding a good pairing is not changed by the reordering. Once a good pairing has been found, the scheme will catch the inlier hypothesis associated with that pairing and keep it or some other inlier hypothesis to the end. But since P is simply the probability that a good pairing will be found, one can think of the scheme as if it stopped directly with the first inlier hypothesis found. This means that one can ignore the reordering in Step 4 as if it was a null operation and the ordering was fixed from the outset. Taken together, these two facts mean that in the i.a.-model, the efficiency for a fixed time t of a scheme of type Algorithm 1 is equivalent to the efficiency of some preemption scheme with the following constraint on the scoring sequence $X_2$ (and vice versa):

$$[(o,h) \in X_i] \rightarrow [(j,k) \in X_j j=1, \ldots, o k=1, \ldots h] \quad (44)$$

Thus, one can equivalently maximize the efficiency of the latter type of scheme, which is called block-dominant. The first good pairing found by the block-dominant scheme must be the pairing of the first inlier observation with the first inlier hypothesis. Maximizing efficiency is thus equivalent to maximizing the probability that this pairing is present in the evaluated terms. Let the probability distribution of the first inlier observation be $p_O(o)$. Let the probability distribution of the first inlier hypothesis be $p_H(h)$. According to Assumption 4, these distributions are independent. Moreover, $$p_o(o) = \begin{cases} \frac{n}{N-o+1} \binom{N-n}{o-1} \binom{N}{o-1}^{-1} & o \leq N-n+1 \\ 0 & o > N-n+1 \end{cases} \quad (45)$$

$$P_H(h) = (1-\lambda)^{h-1} \lambda \quad (46)$$

and the efficiency of the preemption scheme is $$E(f) = n \sum_{o=1}^{N} \sum_{h=1}^{f(o)} p_o H(o, h) \quad (47)$$

where $p_O H(o, h) = p_O(o) p_H(h)$. It is desired to find the most efficient preemption schemes for different times t. It is assumed that f(1)=M for some M, is tractable. The present invention starts with the preemption scheme for which f(1)=M and f(o)=0 for o>1. Then the present invention inductively keeps adding the unused term for which $P_{O,H}$ is the largest, with the restriction that $h \leq f(1)$. The functions $p_O$ and $P_H$ are decreasing, which means that one must end up with a valid block-dominant scheme. Moreover, all the schemes that pass through must necessarily maximize the efficiency for the time that they spend over all preemption schemes for which f(1)=M. The optimal block-dominant schemes in the i.a.-model can therefore be computed for all t up to some value $t_{max}$ of choice by computing the optimal schemes under the restriction f(1)=M for all $M \leq (t_{max}/\tau)$. The execution time follows Equation 37 and schemes for the same t are easily compared using Equation 47.

Finally, it should be noted that in the i.a.-model, the most efficient scoring sequence starts out down the diagonal, i.e. $x_i=(i, i)$. Assume for a moment that the hypothesis generation cost is zero, i.e. $\tau=0$. Also assume another probability distribution for the observations, where an observation is an inlier with a probability $\alpha$ independent of the other observations. Then, the maximum efficiency is achieved by the scoring sequence defined by $x_i=((i-1) \% N)+1, i)$, where % denotes the modulo operation. To see this, first observe that there can never be a reason for scoring a hypothesis twice, since one can generate a new hypothesis for free which has never participated in a bad pairing and therefore is an inlier with as high or higher probability. Let now $\gamma(o)$ denote the number of times observation o is paired with a new hypothesis in the scoring sequence. Then the probability of not finding a good pairing is $$\prod_{o=1}^{N} (1 - \alpha + \alpha(1-\lambda)^{\gamma(o)}) \quad (48)$$

Under the constraint $\Sigma_{o=1}^{N} \gamma(o)=t$, this has to be minimized by a function $\gamma(o)$ that is as constant as possible. To see this, observe that adding 1 to $\gamma(o)$ subtracts $\alpha \lambda (1-\lambda)^{\gamma(o)}$ from the factor of index o, which in turn reduces the whole probability by the fraction $$\frac{\alpha \lambda}{\alpha + (1-\alpha)(1-\lambda)^{-\gamma(o)}} \quad (49)$$

of its value. Since this fraction decreases with $\gamma(o)$, the statement follows.

Figure 4:
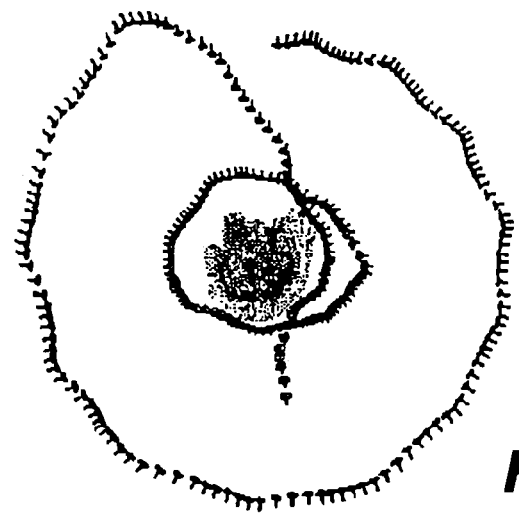
FIG. 4 illustrates reconstruction from a sequence that was acquired by moving a hand-held camera around a flower pot.
Figure 5:
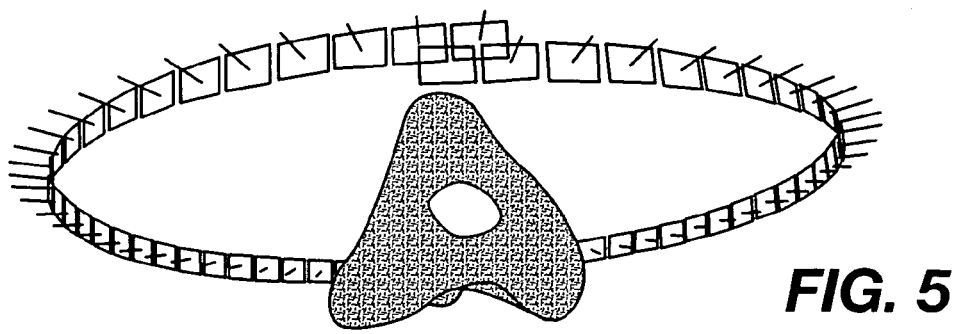
FIG. 5 illustrates reconstruction from a turn-table sequence.

Thus, the present preemptive scoring enables the present invention to perform structure and motion estimation in real-time. For example, FIG. 4 illustrates a reconstruction from a sequence that was acquired by moving a hand-held camera around a flower pot, first in a wide circle and then in a tighter circle, with some forward motion in between. In another example, FIG. 5 illustrates a reconstruction of a turn-table sequence.

Figure 6:
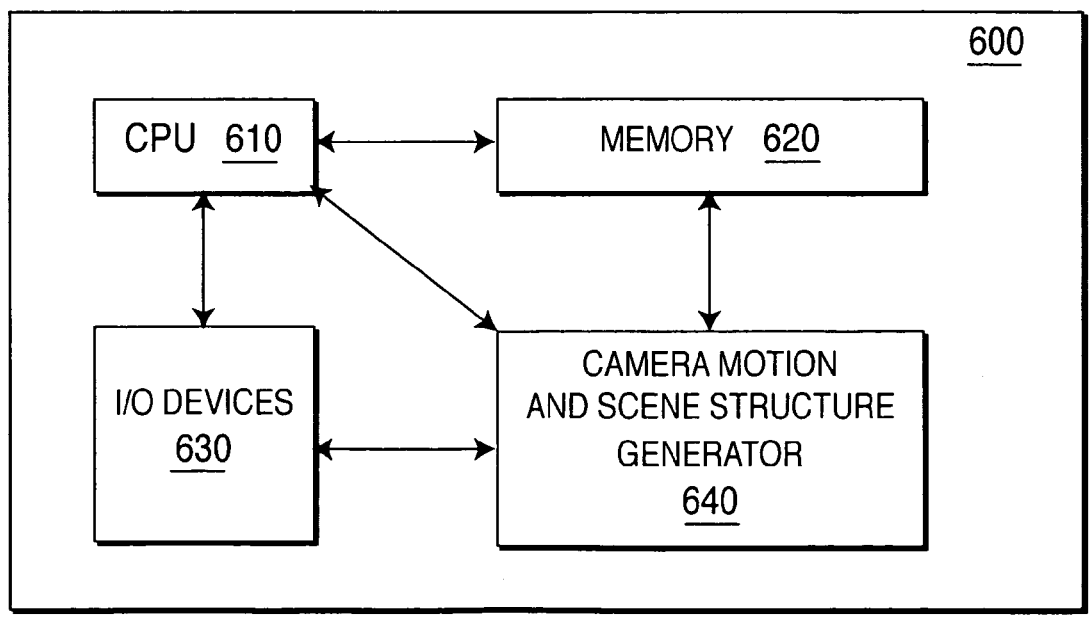
FIG. 6 illustrates a block diagram of the present invention implemented with a general purpose computer.

FIG. 6 illustrates a block diagram of a camera motion and/or scene structure generator or system 600 of the present invention. In one embodiment, the camera motion and/or scene structure generator 600 is implemented using a general purpose computer or any other hardware equivalents.

Thus, the camera motion and/or scene structure generator 600 comprises a processor (CPU) 610, a memory 620, e.g., random access memory (RAM) and/or read only memory (ROM), a camera motion and/or scene structure generator or module 640, and various input/output devices 630, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands).

It should be understood that the camera motion and/or scene structure generator or module 640 can be implemented as physical devices that are coupled to the CPU 610 through a communication channel. Alternatively, the camera motion and/or scene structure generator 640 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 620 of the computer. As such, the camera motion and/or scene structure generator (including associated data structures) of the present invention can be stored on a computer readable medium, e.g., RAM memory, magnetic or optical drive or diskette and the like.

While foregoing is directed to the preferred embodiment of the present invention, other and further embodiments of the invention may be devised without departing from the basic scope.

What is claimed is:

1. A method for determining camera pose from a plurality of point correspondences between at least two images, comprising:
   selecting a plurality of five point correspondences from the plurality of point correspondences;
   generating at least one hypothesis from each of said five point correspondences based on a tenth degree polynomial generated by
      extracting a nullspace of a 5×9 matrix;
      expanding in accordance with cubic constraints;
      applying Gauss-Jordan elimination; and
      expanding determinant polynomials of two 4×4 polynomial matrices to obtain said tenth degree polynomial directly;
   scoring said plurality of hypotheses for determining a best hypothesis; and
   generating rotation and translation information of said camera pose from said best hypothesis.

2. The method of claim 1, wherein intrinsic parameters associated with said plurality of point correspondences are considered calibrated.

3. The method of claim 2, wherein said intrinsic parameters include focal length.

4. The method of claim 1, wherein said rotation and translation information are derived from an essential matrix, E.

5. The method of claim 4, wherein said essential matrix E is a 3×3 matrix that satisfies:

$$EE^T E - \frac{1}{2}\text{trace}(EE^T)E = 0.$$

6. The method of claim 1, wherein said scoring step comprises:
   scoring said plurality of hypotheses against a first subset of a plurality of observations;
   retaining a subset of said scored hypotheses;
   scoring said retained subset of said scored hypotheses against a second subset of the plurality of observations;
   retaining a subset of said second scored hypotheses; and
   repeating said scoring and retaining steps for the plurality of observations.

7. An apparatus for determining camera pose from a plurality of point correspondences between at least two images, comprising:
   means for selecting a plurality of five point correspondences from the plurality of point correspondences;
   means for generating at least one hypothesis from each of said five point correspondences based on a tenth degree polynomial generated by
      extracting a nullspace of a 5×9 matrix;
      expanding in accordance with cubic constraints;
      applying Gauss-Jordan elimination; and
      expanding determinant polynomials of two 4×4 polynomial matrices to obtain said tenth degree polynomial directly;
   means for scoring said plurality of hypotheses for determining a best hypothesis; and
   means for generating rotation and translation information of said camera pose from said best hypothesis.

8. The apparatus of claim 7, wherein intrinsic parameters associated with said plurality of point correspondences are considered calibrated.

9. The apparatus of claim 8, wherein said intrinsic parameters include focal length.

10. A computer-readable medium having stored thereon a plurality of instructions, the plurality of instructions including instructions which, when executed by a processor, cause the processor to perform the steps of a method for determining camera pose from a plurality of point correspondences between at least two images, comprising of:
   selecting a plurality of five point correspondences from the plurality of point correspondences;
   generating at least one hypothesis from each of said five point correspondences based on a tenth degree polynomial generated by
      extracting a nullspace of a 5×9 matrix;
      expanding in accordance with cubic constraints;
      applying Gauss-Jordan elimination; and
      expanding determinant polynomials of two 4×4 polynomial matrices to obtain said tenth degree polynomial directly;
   scoring said plurality of hypotheses for determining a best hypothesis; and
   generating rotation and translation information of said camera pose from said best hypothesis.

11. The computer-readable medium of claim 10, wherein intrinsic parameters associated with said plurality of point correspondences are considered calibrated.

12. The computer-readable medium of claim 11, wherein said intrinsic parameters include focal length.

13. The computer-readable medium of claim 10, wherein said scoring step comprises:
   scoring said plurality of hypotheses against a first subset of a plurality of observations;
   retaining a portion of said scored hypotheses;
   scoring said retained portion of said scored hypotheses against a second subset of the plurality of observations;
   retaining a portion of said second scored hypotheses; and
   repeating said scoring and retaining steps for the plurality of observations.

14. A method for scoring a plurality of hypotheses for determining a best hypothesis, where rotation and translation information of a camera pose can be derived from said best hypothesis, comprising:
   scoring the plurality of hypotheses against a first subset of a plurality of observations;
   retaining a portion of said scored hypotheses;
   scoring said retained subset of said scored hypotheses against a second subset of the plurality of observations;
   retaining a portion of said second scored hypotheses; and
   repeating said scoring and retaining steps for the plurality of observations.

* * * * *